(12) United States Patent
Hawthorn et al.

(10) Patent No.: US 12,729,599 B2
(45) Date of Patent: Sep. 8, 2026

(54) METHOD AND TOOL FOR CEMENTING WELLBORE

(71) Applicant: Baker Hughes Oilfield Operations LLC, Houston, TX (US)

(72) Inventors: Andrew Hawthorn, Missouri City, TX (US); Angela Doan, Spring, TX (US); Muhammad Yasser Haddad, Oslo (NO); Antonio Bottiglieri, The Woodlands, TX (US); Gregory Dean, Montgomery, TX (US); Bennie Jackson Lindsey, Conroe, TX (US); Mats Ingebretsen, Stavanger (NO)

( * ) Notice: Subject to any disclaimer, the term of this patent is extended or adjusted under 35 U.S.C. 154(b) by 0 days.

(21) Appl. No.: 19/049,125

(22) Filed: Feb. 10, 2025

(65) Prior Publication Data

US 2026/0235012 A1 Aug. 13, 2026

(51) Int. Cl.
*E21B 33/13* (2006.01)
*C09K 8/46* (2006.01)
*E21B 28/00* (2006.01)
*E21B 47/005* (2012.01)
*E21B 47/09* (2012.01)

(52) U.S. Cl.
CPC ................ *E21B 33/13* (2013.01); *C09K 8/46* (2013.01); *E21B 28/00* (2013.01); *E21B 47/005* (2020.05); *E21B 47/09* (2013.01)

(58) Field of Classification Search
None
See application file for complete search history.

(56) References Cited

U.S. PATENT DOCUMENTS 4,703,427 A 10/1987 Catala et al.
5,072,388 A * 12/1991 O'Sullivan ........... E21B 47/006 73/598
6,444,316 B1 * 9/2002 Reddy ...................... B01J 13/22 428/407
6,527,051 B1 3/2003 Reddy et al.
9,416,619 B2 8/2016 Aines et al.
10,941,329 B2 * 3/2021 Droger ................ C04B 20/1051
2011/0048697 A1 * 3/2011 Lewis ..................... E21B 33/14 166/177.4
2011/0048711 A1 3/2011 Lewis et al.
2017/0058660 A1 * 3/2017 Hunter .................. G01N 29/42
(Continued)

OTHER PUBLICATIONS

Notification of Transmittal of the International Search Report and Written Opinion for PCT/US2026/014497; European Patent Office; Mailed Jun. 8, 2026; 11 pages.

*Primary Examiner* — Andrew Sue-Ako
(74) *Attorney, Agent, or Firm* — Baker Hughes Company

(57) ABSTRACT

A wellbore can be cemented by injecting into the wellbore a cement slurry comprising an accelerator composite having a shell encapsulating a core comprising an accelerator; a cementitious material; and an aqueous carrier; passing the cement slurry through a tool that includes an ultrasonic emitter, emitting ultrasonic waves from the ultrasonic emitter as the cement slurry passes the ultrasonic emitter to break the shell releasing the accelerator from the accelerator composite and activating the cement slurry. This process can be implemented using a tool with includes a tube through which cement slurry can be injected into the wellbore and an ultrasonic emitter positioned to direct ultrasonic waves onto the cement slurry as is moves through the tube.

16 Claims, 2 Drawing Sheets

(56) References Cited

U.S. PATENT DOCUMENTS

| | | | |
|---|---|---|---|
| 2018/0156025 | A1 | 6/2018 | Manders et al. |
| 2020/0063553 | A1* | 2/2020 | Zemla ..................... E21B 23/10 |
| 2020/0181475 | A1* | 6/2020 | Dighe ................. C04B 40/0641 |
| 2022/0235644 | A1* | 7/2022 | Orlov ..................... C09K 8/725 |
| 2025/0059428 | A1 | 2/2025 | Suresh et al. |
| 2025/0059429 | A1 | 2/2025 | Suresh et al. |

* cited by examiner

METHOD AND TOOL FOR CEMENTING WELLBORE

BACKGROUND

In the oil and gas industry, cementing is a technique employed during many phases of borehole operations. For example, cement may be employed to secure various casing strings and/or liners in a well. In other cases, cement may be used in remedial operations to repair casing and/or to achieve formation isolation. In still other cases, cement may be employed to isolate selected zones in the borehole and to temporarily or permanently abandon a borehole.

A cement slurry can be formed by mixing dry cement components with water using hydraulic jet mixers, re-circulating mixers, or batch mixers. Since the cement slurry must remain pumpable before it reaches the desired location downhole, normally a cement slurry is used right after it is formed. In addition, once a cement slurry is injected into a wellbore, the set time can be affected by the temperature of the wellbore. As such, the set time is not controllable as it is desired by the users but rather ruled by the well conditions and the time when a cement slurry is formed. Accordingly, there is a need for methods that are effective to decrease control the set time of the cement based on the user's demand.

SUMMARY

Disclosed herein is a method a method of cementing a wellbore, the method comprising: injecting into the wellbore a cement slurry, passing the cement slurry through a tool that includes an ultrasonic emitter, and emitting ultrasonic waves from the ultrasonic emitter as the cement slurry passes the ultrasonic emitter. The cement slurry includes an accelerator composite having a shell encapsulating a core comprising an accelerator; a cementitious material; and an aqueous carrier. The emission of ultrasonic waves breaks the shell releasing the accelerator from the accelerator composite and activating the cement slurry.

Also disclosed herein is a tool for use in wellbore formation comprising a tube through which cement slurry can be injected into a wellbore and an ultrasonic emitter positioned to direct ultrasonic waves onto the cement slurry as is moves through the tube. Also disclosed is a wellbore formation system comprising such tool and including a cement slurry that comprises an accelerator composite having a shell encapsulating a core comprising an accelerator; a cementitious material; and an aqueous carrier.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
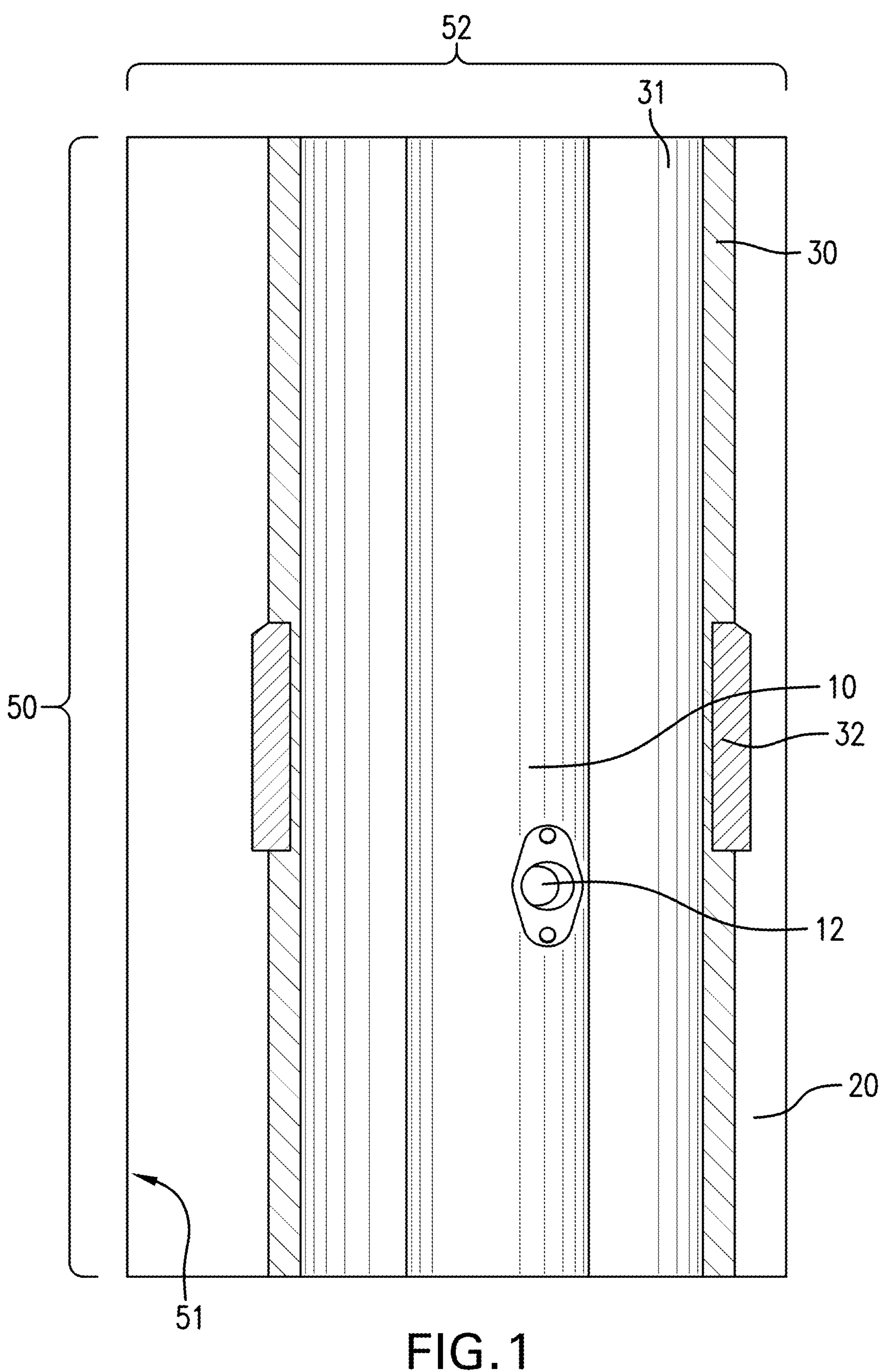
FIG. 1 is a view of a borehole system including a tool having an ultrasonic emitter.
Figure 2:
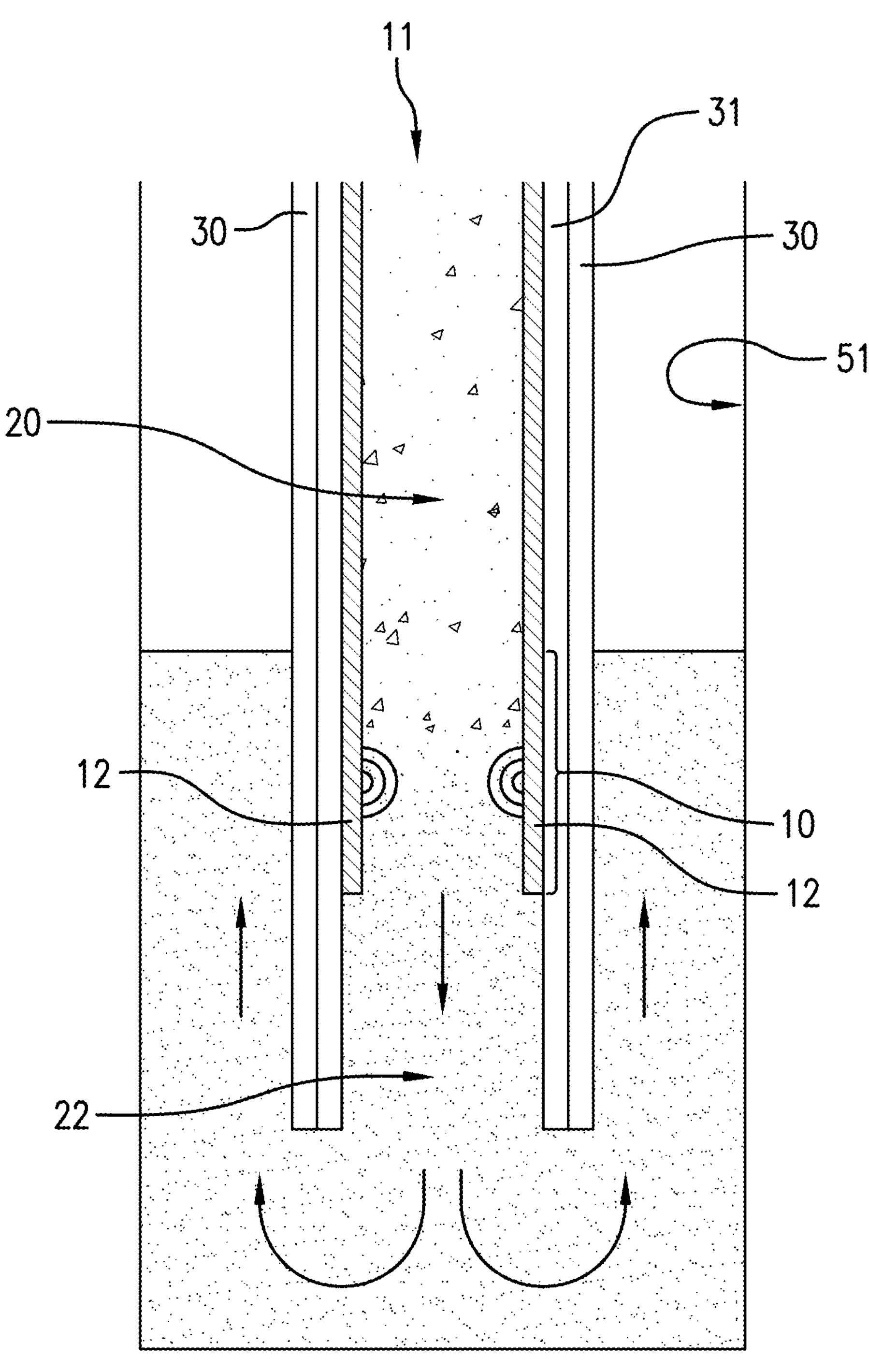
FIG. 2 is a schematic of a cross-section of a borehole showing a tool having an ultrasonic emitter directed inward.

Referring to FIGS. 1 and 2, the method as disclosed herein can be implemented in a borehole system using a tool 10 that includes an ultrasonic emitter. The wellbore system can include a formation 50 in which a well bore 52 is formed. The wellbore system includes a casing 30 and an interior pipe 31 having a hollow interior. The tool 10 is inserted into the hollow interior of the pipe 31. A cement slurry 20 is pushed through a hollow center 11 in the tool 10 and into a region between the outer wall 51 of the borehole 52 (which is a surface of the formation 50) and the outer surface of the casing 30. The tool 10 includes an ultrasonic emitter 12.

The cement slurry 20 comprises a cementitious material, an aqueous carrier, and an accelerator composite. The accelerator composite contains an accelerator in a core of core/shell particles. By using a protective shell, the activity of the accelerator is preserved for the intended application. In addition, loss due to adsorption is prevented. Moreover, the accelerator can be released when needed since the disintegration of the shell can be triggered on demand.

The accelerator composite can be free of phase change materials, gas producing materials, and other materials that expand enough upon exposure to heat to break the shell. The accelerator composite can be free of magnetic materials. The core of the accelerator composite can consist of accelerator materials.

The tool includes an interior tube 11 through which the cement slurry 20 can be pushed. When the ultrasonic emitter 12 is on (i.e., emitting ultrasonic signals) the shell of the core-shell particles is broken, and the accelerator can activate the cementitious material 20 to an activated cementitious material 22 which begins to set or cure. The ultrasonic emitter 12 can be outward facing from the tool 10 as shown in FIG. 1, but preferably the tool includes an ultrasonic emitter 12 that is inward facing into the interior tube as shown in FIG. 2.

The amount of the accelerator composite is not particularly limited and is in an amount sufficient to accelerate the setting of the cement slurry once the accelerator is released. The accelerator composite can be present in the cement slurries in an amount of about 0.1 to about 10 wt %, based on the weight of the cementitious material, preferably about 0.5 to about 5 wt %, based on the weight of the cementitious material.

The accelerator can include alkali metal salts such as potassium chloride, sodium chloride, sodium meta silicate, alkaline earth metal salts such as calcium chloride, calcium sulfate hemihydrate, a mixture of calcium sulfate hemihydrate and Portland cement, or a combination comprising at least one of the foregoing. As additional examples, the accelerator can include sodium meta silicate, sodium silicate, colloidal silica, and/or calcium chloride.

In the composite, the accelerator is encapsulated in a shell to delay its release or contact with other components of the cement slurry. The shell of the composite can include natural polymers such as alginate, cellulose, starch, chitosan, dextran sulfate, pectin, or xanthan gum; or synthetic polymers such as polymethacrylate, polydimethylsiloxane, polystyrene, polyvinyl acetate, or polyvinylpyrrolidone. The shell can also include inorganic materials such as silica, alumina, titania, sodium silicate, or calcium carbonate; metallic materials such as nickel, nickel phosphorus, or nickel alloys; iron oxides such as magnetite, maghemite, and hematite; oxyhydroxides such as goethite, ferrihydrite, and lepidocrocite; iron salts such as iron carbonates, iron sulfides, and iron carbides; or a combination thereof.

The thickness of the shell can be about 5 μm to about 5000 μm or about 200 μm to about 1000 μm.

The accelerator in the core of the core-shell accelerator composite can include alkali metal salts such as potassium chloride, sodium chloride, sodium meta silicate, alkaline earth metal salts such as calcium chloride, calcium sulfate hemihydrate, a mixture of calcium sulfate hemihydrate and Portland cement, or a combination comprising at least one of the foregoing.

In the composite, the accelerator is encapsulated in a shell to delay its release or contact with other components of the cement slurry. The shell of the composite can include natural polymers such as alginate, cellulose, starch, chitosan, dextran sulfate, pectin, or xanthan gum; or synthetic polymers such as polymethacrylate, polydimethylsiloxane, polystyrene, polyvinyl acetate, or polyvinylpyrrolidone. The shell can also include inorganic materials such as silica, alumina, titania, sodium silicate, or calcium carbonate; metallic materials such as nickel, nickel phosphorus, or nickel alloys; iron oxides such as magnetite, maghemite, and hematite; oxyhydroxides such as goethite, ferrihydrite, and lepidocrocite; iron salts such as iron carbonates, iron sulfides, and iron carbides; or a combination thereof.

The thickness of the shell can be about 5 μm to about 5000 μm or about 200 μm to about 1000 μm.

The accelerator composite as described herein can be manufactured via methods such as physical methods, chemical methods, or physical-chemical methods, for example, those methods as described in Advances in Polymer Technology Volume 2020, Article ID 9490873.

In physical methods, the formation of the shell only involves physical processes such as drying, dehydration, and adhesion. Examples of physical methods for encapsulating the accelerator and the disintegrating agent include spray-drying and solvent evaporation. In a spray-drying method, an oil-water emulsion containing the accelerator, the disintegration agent, the optional magnetic material, the optional matrix material, and the shell material can be sprayed in a drying chamber by using an atomizer, drying the sprayed droplets through drying gas stream, and separating the solid particles by cyclone and filter. In a solvent evaporation method, the accelerator, the disintegrating agent, the optional magnetic material, and the optional matrix material can be added to a polymer solution containing the shell material dissolved in a volatile solvent to form an emulsion, and the shell can be formed on the droplets by evaporating the solvent. The composite can then be formed through filtration and drying.

Chemical microencapsulation methods utilize polymerization or a condensation process of monomers, oligomers, or prepolymers as raw materials to form shells at an oil-water interface. For example, individual components, e.g., the accelerator, the disintegrating agent, the optional magnetic material, the optional matrix material, and the resin material (e.g., monomers and/or oligomers used to form a shell) can be combined in a vessel or reactor to form a reaction mixture, and then agitated to mix components. The reaction mixture can be heated at a temperature or at a pressure commensurate with forming the shell.

Hydrolysis and subsequent condensation can also be used to form inorganic shells. For example, alkoxysilanes or metal oxides can undergo hydrolysis then condensation to form a shell of silica, alumina or titania.

In addition to the accelerator composite, the cement slurry further comprises a cementitious material. The cementitious material can be any material that sets and hardens by reaction with water, and is suitable for forming a set cement downhole, including mortars and concretes. Suitable cementitious materials, including mortars and concretes, can be those typically employed in a wellbore environment, for example those comprising calcium, magnesium, barium, aluminum, silicon, oxygen, and/or sulfur. Such cementitious materials include, but are not limited to, Portland cements, pozzolan cements, gypsum cements, high alumina content cements, silica cements, and high alkalinity cements, or combinations of these. Portland cements are particularly useful. In some embodiments, the Portland cements that are suited for use are classified as Class A, B, C, G, and H cements according to American Petroleum Institute, API Specification for Materials and Testing for Well Cements, and ASTM Portland cements classified as Type I, II, III, IV, and V.

The cementitious material can be present in the cement slurry in an amount of about 5 to about 60 wt. % based on the total weight of the cement slurry, preferably about 10 to about 45 wt. % of the weight of the cement slurry, more preferably about 15 to about 40 wt. %, based on the total weight of the cement slurry.

The cement slurry can optionally contain aggregate. The term "aggregate" is used broadly to refer to a number of different types of both coarse and fine particulate material, including, but are not limited to, sand, gravel, slag, recycled concrete, silica, glass spheres, limestone, feldspar, and crushed stone such as chert, quartzite, and granite. The fine aggregates are materials that entirely pass through a Number 4 sieve (ASTM C 125 and ASTM C 33). The coarse aggregate are materials that are retained on a Number 4 sieve (ASTM C 125 and ASTM C 33). In an embodiment, the aggregate comprises sand such as sand grains. The sand grains can have a size from about 1 μm to about 2000 μm, specifically about 10 μm to about 1000 μm, and more specifically about 10 μm to about 500 μm. As used herein, the size of a sand grain refers the largest dimension of the grain. Aggregate can be present in an amount of about 10 wt % to about wt 95%, about 10 wt % to about 85 wt %, about 10 wt % to about 70 wt %, about 20 wt % to about 80 wt %, about 20 wt % to about 70 wt %, about 20 wt % to about 60 wt %, about 20 wt % to about 40 wt %, about 50 wt % to about 80 wt %, or about 50 wt % to about 70 wt % based on a total weight of the cement slurry.

The cement slurry further comprises an aqueous carrier fluid. The aqueous carrier fluid is present in the cement slurries in an amount of about 0.5 wt % to about 60 wt %, specifically in an amount of about 1 wt % to about 40 wt %, more specifically in an amount of about 1 wt % to about 15 wt % or about 2 wt % to about 15 wt %, based on the total weight of the cement slurry. The aqueous carrier fluid can be fresh water, brine (including seawater), an aqueous base, or a combination comprising at least one of the foregoing. It will be appreciated that other polar liquids such as alcohols and glycols, alone or together with water, can be used in the carrier fluid. In an embodiment, the cement slurry comprises water in an amount of about 0.5 wt % to about 60 wt %, specifically in an amount of about 1 wt % to about 40 wt %, more specifically in an amount of about 1 wt % to about 15 wt % or about 2 wt % to about 15 wt %, based on the total weight of the cement slurry.

The cement slurry can further comprise various additives. Exemplary additives include a retarder, a high range water reducer or a superplasticizer, a reinforcing agent, a self-healing additive, a fluid loss control agent, a weighting agent to increase density, an extender to lower density, a foaming agent to reduce density, a dispersant to reduce viscosity, a thixotropic agent, a bridging agent or lost circulation material, a clay stabilizer, ductility control agents, or a combination comprising at least one of the foregoing. These additives are selected to avoid imparting unfavorable characteristics to the cement slurry, and to avoid damaging the wellbore or subsurface formation. Each additive can be present in amounts known to those of skill in the art.

Retarders can retard the set time of the cement slurry until the cement slurry has reached its ultimate location within the subterranean formation. Exemplary retarders include lignosulfonates, organic acids, phosphonic acid derivatives, synthetic polymers (e.g., copolymers of 2-acrylamido-2-methylpropane sulfonic acid ("AMPS") and unsaturated carboxylic acids), inorganic borate salts, and combinations thereof.

High range water reducers or superplasticizers can be grouped under four major types, namely, sulfonated naphthalene formaldehyde condensed, sulfonated melamine formaldehyde condensed, modified lignosulfonates, and other types such as polyacrylates, polystyrene sulfonates.

Reinforcing agents include fibers such as metal fibers and carbon fibers, silica flour, and fumed silica. The reinforcing agents act to strengthen the set material formed from the cement slurries.

Self-healing additives include swellable elastomers, encapsulated cement particles, and a combination comprising at least one of the foregoing. Self-healing additives are known and have been described, for example, in U.S. Pat. Nos. 7,036,586 and 8,592,353.

Fluid loss control agents can be present, for example a latex, latex copolymers, nonionic, water-soluble synthetic polymers and copolymers, such as guar gums and their derivatives, poly(ethyleneimine), cellulose derivatives, and polystyrene sulfonate.

Weighting agents are high-specific gravity and finely divided solid materials used to increase density, for example silica flour, fly ash, calcium carbonate, barite, hematite, ilemite, sideritewollastonite, hydroxyapatite, fluorapatite, chlorapatite and the like. In some embodiments, about 15 wt % to about 55 wt % of wollastonite is used in the cement slurry, based on the total weight of the cement slurries. Hollow nano- and microspheres of ceramic materials such as alumina, zirconia, titanium dioxide, boron nitride, and carbon nitride can also be used as density reducers.

Extenders include low density aggregates as described above, clays such as hydrous aluminum silicates (e.g., bentonite (85% mineral clay smectite), pozzolan (finely ground pumice of fly ash), diatomaceous earth, silica, e.g., a quartz and condensed silica fumed silica, expanded Pearlite, gilsonite, powdered coal, and the like.

The aqueous carrier fluid of the cement slurry can be foamed with a liquid hydrocarbon or a gas or liquefied gas such as nitrogen, or air. The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts, and alkyl amido amine quaternary ammonium salts. A foam system is used in low pressure or water sensitive formations. A mixture of foaming and foam stabilizing dispersants can be used. The mixture can be included in the cement slurry in an amount of about 1% to about 5% by volume of water in the cement slurry.

Examples of suitable dispersants include but are not limited to naphthalene sulfonate formaldehyde condensates, acetone formaldehyde sulfite condensates, and glucan delta lactone derivatives. Other dispersants can also be used depending on the application of interest.

Clay stabilizers prevent a clay from swelling downhole upon contact with the water or applied fracturing pressure and can be, for example, a quaternary amine, a brine (e.g., KCl brine), choline chloride, tetramethyl ammonium chloride, or the like. Clay stabilizers also include various salts such as NaCl, CaCl2, and KCl.

The pH of the cement slurry can be about 7 to about 13, about 7 to about 10, about 7 to about 9 or about 7 to about 8. A buffering agent can be optionally included in the cement slurries. Exemplary buffering agents include 2-amino-2-hydroxmethyl-propane-1,3-diol (TRIS), phosphate, carbonate, histidine, BIS-TRIS propane, 3-(N-morpholino) propanesulfonic acid (MOPS), (4-(2-hydroxyethyl)-1-piperazineethanesulfonic acid (HEPES), 2-[1,3-dihydroxy-2-(hydroxymethyl) propan-2-yl]aminoJethanesulfonic acid (TES), 4-(N-Morpholino) butanesulfonic acid (MOBS), 3-(N-morpholino) propanesulfonic acid (MOPS), 3-(N,N-Bis [2-hydroxyethyl]amino)-2-hydroxypropanesulfonic acid (DIPSO), N-Tris(hydroxymethyl)methyl]-3-amino-2-hydroxypropanesulfonic acid (TAPSO), triethanolamine (TEA), pyrophosphate, N-(2-Hydroxyethyl) piperazine-N'-(2-hydroxypropanesulfonic acid) (HEPPSO), piperazine-1,4-bis(2-hydroxypropanesulfonic acid) dehydrate (POPSO), tricine, glyccylglycine, bicine, N-[tris(hydroxymethyl) methyl]-3-aminopropanesulfonic acid (TAPS), taurine, ammonia, ethanolamine, glycineTRIS, piperazine-N,N'-bis (2-ethanesulfonic acid) (PIPES).

The solid content of the cement slurry can be about 30 wt % to about 90 wt %, preferably about 60 wt % to about 90 wt %, more preferably about 65 wt % to about 85 wt %, based on the total weight of the cement slurry.

The density of the cement slurry can vary widely depending on downhole conditions. Such densities can include about 5 to about 17 or about 5 to about 12 pounds per gallon when foamed. When unfoamed the density of a cement slurries can vary with such densities between about 9 up to about 20, about 9 up to about 15 pounds per gallon, or about 10 to about 14 pounds per gallons, or about 11 up to about 13 pounds per gallon. The cement slurries can also be higher density, for example about 15 to about 27 pounds per gallon or about 15 to about 22 pounds per gallon.

The various properties of the cement slurry can be varied and can be adjusted according to well control and compatibility parameters of the fluid with which it is associated for example a drilling fluid. The cement slurry can be used to form downhole components, including various casings, seals, plugs, packings, liners, and the like. The cement slurries can be used in vertical, horizontal, or deviated wellbores.

In general, the components of the cement slurry can be premixed or is injected into the wellbore without mixing, e.g., injected "on the fly" where the components are combined as they are being injected downhole. Preferably the cement slurry is formed by blending the accelerator composite, the cementitious material, the aggregate, and the aqueous carrier before the cement slurries are injected into the wellbore.

A pumpable or pourable cement slurry can be formed by any suitable method. In an exemplary embodiment, the components of the cement slurries are combined using conventional cement mixing equipment. The cement slurry can then be injected, e.g., pumped and placed by various conventional cement pumps and tools to any desired location within the wellbore to fill any desired shape form. In an embodiment, injecting the cement slurry comprises pumping the cement slurry via a tubular in the wellbore. For example, the cement slurry can be pumped into an annulus between a tubular and a wall of the wellbore via the tubular. Once the cement slurry has been placed and assumed the shape form of the desired downhole article, the cement slurry is allowed to set and form a permanent shape of an article, for example, a plug.

The method is particularly useful for cementing a wellbore, which includes injecting, generally pumping, into the wellbore the cement slurry at a pressure sufficient to displace a drilling fluid, for example a drilling mud, a cement spacer, or the like, optionally with a "lead cement slurry" or a "tail cement slurry". The cement slurry can be introduced between a penetrable/rupturable bottom plug and a solid top plug. The cement slurry includes the accelerator composite The ultrasonic emitter transmits ultrasonic waves to the cement slurry 20 causing the shell of the core-shell accelerator composite to break. The ultrasonic waves can have a frequency of, for example, at least 10, at least 15, at least 20 or at least 25 KiloHertz (kHz), while the frequency can be up to, for example, 4.5, up to 4, up to 3.5, up to 3, up to 2.5, up to 2, up to 1.5, up to 1, or up to 0.5 MegaHertz (MHz), or up to 100, up to 80, or up to 60 kHz. For example, at the lower frequency a high-power output can be used while at higher frequency a lower power output can be used.

A benefit of the method is that it can reduce rig time. For example, if the tool 10 is equipped with an outward facing ultrasonic emitter/sensor, the tool can be used for various inspection activities, such as log the cement before placement of the cement, evaluate casing 30, locate the casing collar 32 and inspect cement integrity without the need for separate runs of separate tools into the well-bore. This can save numerous hours of rig time by reducing number of runs required to perform the operation and the waiting on cement. A benefit of the interior directed ultrasonic emitter is that activation of the cementitious slurry is that better enables activation of the cement slurry 20 as it can be difficult or undesirable to activate the ultrasonic tool at the bottom of the casing.

Set forth below are various aspects of the disclosure.

Aspect 1: A method of cementing a wellbore, the method comprising: injecting into the wellbore a cement slurry which includes an accelerator composite having a shell encapsulating a core comprising an accelerator; a cementitious material; and an aqueous carrier; and passing the cement slurry through a tool that includes an ultrasonic emitter, and emitting ultrasonic waves from the ultrasonic emitter as the cement slurry passes the ultrasonic emitter to break the shell releasing the accelerator from the accelerator composite and activating the cement slurry.

Aspect 2: The method of Aspect 1, wherein the cement slurry further comprises an aggregate.

Aspect 3: The method of Aspect 1 or 2, wherein the shell comprises at least one of alginate, cellulose, starch, chitosan, dextran sulfate, pectin, xanthan gum, a polymethacrylate, a polydimethylsiloxane, a polystyrene, a polyvinyl acetate, a polyvinylpyrrolidone, silica, alumina, titania, sodium silicate, calcium carbonate, nickel, nickel phosphorus, a nickel alloy, an iron oxide, an oxyhydroxide, or an iron salt.

Aspect 4: The method of any one of the previous Aspects, wherein the accelerator comprises at least one of an alkali metal salt, or an alkali earth metal salt.

Aspect 5: The method of claim 1, wherein the accelerator comprises at least one of sodium meta silicate, sodium silicate, colloidal silica, or calcium chloride.

Aspect 6: The method of any one of the previous Aspects, wherein the accelerator composite is present in an amount of about 0.5 wt. % to about 10 wt. %, based on the total weight of the cementitious material.

Aspect 7: The method of any one of the previous Aspects, wherein the ultrasonic waves are at a frequency of at least 10 KHz.

Aspect 8: The method of any one of the previous Aspects wherein the ultrasonic waves to break the shell are directed to the cement slurry as it passes through the tool.

Aspect 9: The method of any one of the previous Aspects wherein the tool further comprises an outward directed ultrasonic emitter and sensor, and the method includes inspecting the wellbore before injecting the cement slurry or inspecting the cement in the wellbore after injecting and activate the cement.

Aspect 10. A tool for use in wellbore formation comprising a tube through which cement slurry can be injected into a wellbore and an ultrasonic emitter positioned to direct ultrasonic waves onto the cement slurry as is moves through the tube.

Aspect 11. The tool of claim 10 further comprising an ultrasonic sensor positioned to direct ultrasonic waves into the wellbore for inspection of the wellbore.

Aspect 12. A wellbore formation system comprising the tool of claim 10 or 11 wherein the cement slurry comprises an accelerator composite having a shell encapsulating a core comprising an accelerator; a cementitious material; and an aqueous carrier.

Aspect 13: The wellbore formation system of Aspect 12, wherein the cement slurry further comprises an aggregate.

Aspect 14: The wellbore formation system of Aspect 12 or 13, wherein the shell comprises at least one of alginate, cellulose, starch, chitosan, dextran sulfate, pectin, xanthan gum, a polymethacrylate, a polydimethylsiloxane, a polystyrene, a polyvinyl acetate, a polyvinylpyrrolidone, silica, alumina, titania, sodium silicate, calcium carbonate, nickel, nickel phosphorus, a nickel alloy, an iron oxide, an oxyhydroxide, or an iron salt.

Aspect 15: The wellbore formation system of any one Aspects 12 to 14, wherein the accelerator comprises at least one of an alkali metal salt, or an alkali earth metal salt.

Aspect 16: The wellbore formation system of any one Aspects 12 to 15, wherein the accelerator comprises at least one of sodium meta silicate, sodium silicate, colloidal silica, or calcium chloride.

Aspect 17: The wellbore formation system of any one Aspects 12 to 16, wherein the accelerator composite is present in an amount of about 0.5 wt. % to about 10 wt. %, based on the total weight of the cementitious material.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of +8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A tool for use in wellbore formation comprising a tube through which a cement slurry can be injected into a wellbore, one or more ultrasonic emitters which can be positioned to direct ultrasonic waves onto the cement slurry as the cement slurry moves through the tube and can be positioned to emit and sense ultrasonic waves in an outward direction for inspection of the wellbore, wherein the inspection comprises locating a casing collar.

2. A wellbore formation system comprising the tool of claim 1 wherein the cement slurry comprises an accelerator composite having a shell encapsulating a core comprising an accelerator; a cementitious material; and an aqueous carrier.

3. The wellbore formation system of claim 2, wherein the cement slurry further comprises an aggregate.

4. The wellbore formation system of claim 2, wherein the shell comprises at least one of alginate, cellulose, starch, chitosan, dextran sulfate, pectin, xanthan gum, a polymethacrylate, a polydimethylsiloxane, a polystyrene, a polyvinyl acetate, a polyvinylpyrrolidone, silica, alumina, titania, sodium silicate, calcium carbonate, nickel, nickel phosphorus, a nickel alloy, an iron oxide, an oxyhydroxide, or an iron salt.

5. The wellbore formation system of claim 2, wherein the accelerator comprises at least one of an alkali metal salt, or an alkali earth metal salt.

6. The wellbore formation system of claim 2, wherein the accelerator comprises at least one of sodium meta silicate, sodium silicate, colloidal silica, or calcium chloride.

7. The wellbore formation system of claim 2, wherein the accelerator composite is present in an amount of about 0.5 wt. % to about 10 wt. %, based on the total weight of the cementitious material.

8. A method of cementing a wellbore, the method comprising:

injecting into the wellbore a cement slurry comprising:
- an accelerator composite having a shell encapsulating a core comprising an accelerator;
- a cementitious material; and
- an aqueous carrier;

passing the cement slurry through an interior tube of a tool wherein the tool includes one or more ultrasonic emitters; and emitting ultrasonic waves from at least one of the one or more the ultrasonic emitter emitters in an inward direction as the cement slurry passes the through the interior tube to break the shell releasing the accelerator from the accelerator composite and activating the cement slurry; and inspecting by emitting and sensing ultrasonic waves in an outward direction from the tool wherein the inspecting comprises locating a casing collar.

9. The method of claim 8, wherein the cement slurry further comprises an aggregate.

10. The method of claim 8, wherein the shell comprises at least one of alginate, cellulose, starch, chitosan, dextran sulfate, pectin, xanthan gum, a polymethacrylate, a polydimethylsiloxane, a polystyrene, a polyvinyl acetate, a polyvinylpyrrolidone, silica, alumina, titania, sodium silicate, calcium carbonate, nickel, nickel phosphorus, a nickel alloy, an iron oxide, an oxyhydroxide, or an iron salt.

11. The method of claim 8, wherein the accelerator comprises at least one of an alkali metal salt, or an alkali earth metal salt.

12. The method of claim 8, wherein the accelerator comprises at least one of sodium meta silicate, sodium silicate, colloidal silica, or calcium chloride.

13. The method of claim 8, wherein the accelerator composite is present in an amount of about 0.5 wt. % to about 10 wt. %, based on the total weight of the cementitious material.

14. The method of claim 8 wherein the ultrasonic waves are at a frequency of at least 15 kHz up to 4.5 MHz.

15. The method of claim 8 wherein the ultrasonic waves to break the shell are directed to the cement slurry as it passes through the tool.

16. The method of claim 8 wherein the method includes inspecting the cement in the wellbore after injecting and activating the cement.

* * * * *